United States Patent [19]

Lange

[11] Patent Number: 4,467,753

[45] Date of Patent: Aug. 28, 1984

[54] VIBRATION DAMPENER ON ENGINE SHAFT

[75] Inventor: Henry J. Lange, Juneau, Wis.

[73] Assignee: Deere & Company, Moline, Ill.

[21] Appl. No.: 288,851

[22] Filed: Jul. 31, 1981

[51] Int. Cl.³ .............................................. F02F 7/00
[52] U.S. Cl. .................................. 123/195 A; 464/89
[58] Field of Search ...................... 123/195 R, 195 A; 464/89

[56] References Cited

U.S. PATENT DOCUMENTS

| | | | |
|---|---|---|---|
| 1,899,159 | 2/1933 | Krotee | 464/83 |
| 2,262,512 | 11/1941 | Musselman | 464/89 |
| 2,381,488 | 8/1945 | Coulson | 464/89 |
| 2,724,377 | 11/1955 | Nallinger | 123/195 A |
| 2,911,962 | 11/1959 | McRae | 123/195 A |
| 3,681,939 | 8/1972 | Timtner et al. | 464/84 |
| 4,114,472 | 9/1978 | Hornig et al. | 464/89 |
| 4,327,679 | 5/1982 | Crouch et al. | 123/195 R |

Primary Examiner—Craig R. Feinberg

[57] ABSTRACT

In a small tractor, there is provided a suspension system for mounting a small internal combustion engine on the framework of the tractor that includes a pair of vibration-dampening engine mounts substantially on the center of gravity of the engine and an engine mount for the main engine drive shaft. The motor mount for the shaft is incorporated in a pulley device that includes a pulley concentric with but spaced from the shaft so that the vibrations of the shaft and engine are not transmitted to the pulley. The pulley is supported by a journal carried on the tractor frame and the pulley is connected to the shaft through an annular layer of elastomer material that is fixed to rotate both with the pulley and the shaft and which dampens any shaft or engine vibration that might otherwise be transmitted to the pulley and to the frame.

4 Claims, 4 Drawing Figures

VIBRATION DAMPENER ON ENGINE SHAFT

BACKGROUND OF THE INVENTION

It has heretofore been commonly known to mount engines on a supporting frame by means of vibration-dampening motor mounts. Normally, such motor mounts are connected between the engine frame and to the body of the engine at several fore-and-aft positions and on opposite sides of the engine. It has also been known to mount a pulley on the main drive shaft of the engine through a flexible coupling so as to prevent the peak torsional loads of the devices being driven by the pulley from reverting back to the engine and also to dampen the impact of the V-belts upon starting or stopping the engine or upon a shock load occurring on the devices being driven. In small tractors, of what is commonly referred to as lawn and garden varieties, the engine, pulley, and the engine mounts must be located in a relatively small area. Due to the uses of such a tractor, it is preferred to keep all the weight out of the tractor that is possible. Also, due to the size of the tractor, it is particularly important to prevent the engine vibration from being transmitted to the frame and operator's station. Engine mounts are provided to dampen the vibrations created by the small, but relatively powerful engine. It is often difficult to find suitable locations to position the motor mounts extending between the engine and the tractor frame. In lawn and garden tractors, in general, there is no provision for dampening the torque load between the pulley and engine output shaft so that the vibrations of the shaft are generated to the various devices on the tractor and consequently, vibration does occur through the shaft, pulleys and belts that extend between the engine and the devices.

With the above in mind, it is the primary object of the present invention to provide a unique engine suspension system for a tractor that includes a pair of motor mounts on opposite sides of the tractor and generally on a specific center of gravity of the engine. Provided also is a pulley device in which the pulley is concentric with the main drive shaft of the engine and which is supported by a bearing that carries the pulley on the frame. The pulley has internal surfaces that are spaced from the shaft of the drive shaft and there is provided an annular layer of elastomer material which extends between the drive shaft and the pulley. The elastomer layer serves as a vibration dampener between the pulley shaft and the tractor frame and also as a flexible drive to the pulley which will dampen peak and sock loads on the devices to be driven by the tractor. Thus, the entire engine, including its main drive shaft, is supported by a vibration-dampening system on the tractor frame and the drive from the main drive shaft to the various devices is also dampened. Therefore, the vibrations created by the engine will be felt very little by an operator on the tractor. By providing the pair of direct motor mounts between the engine and the engine frame to be on the center of gravity, the dampening support between the shaft and the tractor frame needs merely to balance the engine at its forward end and will carry very little of the load created by the weight of the engine.

DESCRIPTION OF THE PREFERRED EMBODIMENT

Figure 1:
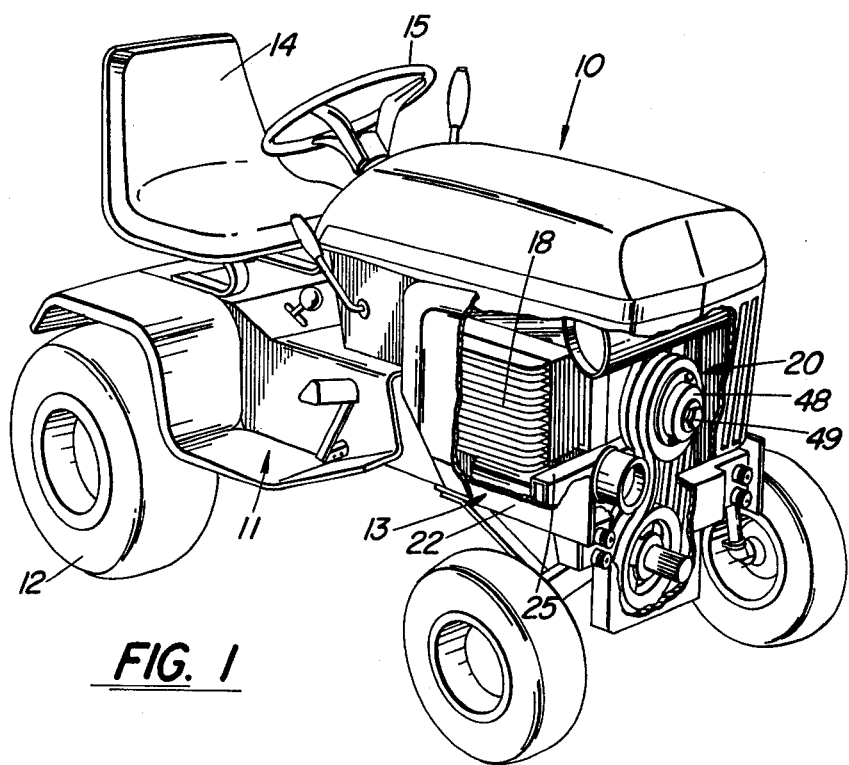
FIG. 1 is a front perspective view taken of a lawn and garden tractor utilizing the features of the present invention with the engine and respective pulley and mounting arrangements shown in dotted representation.
Figure 2:
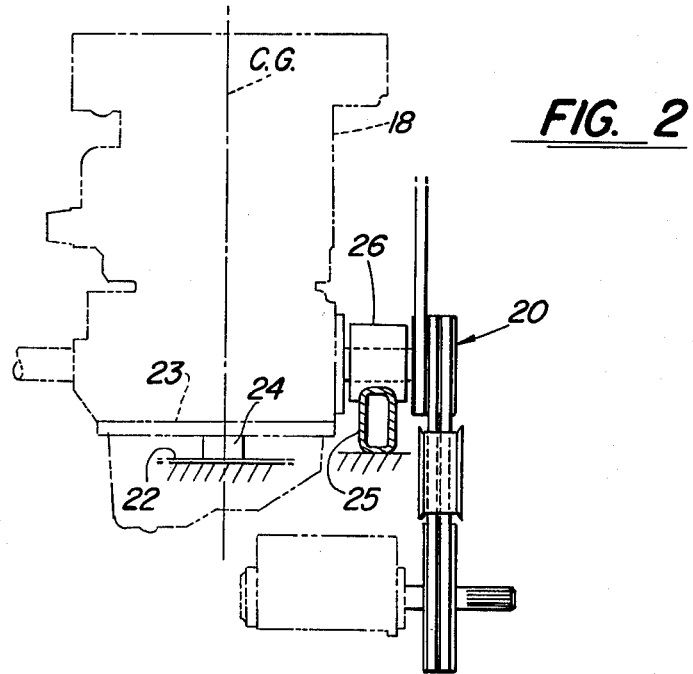
FIG. 2 is a side view of the engine and its pulley, with the engine in phantom, and their respective mounting structures connecting them to the tractor frame.

Referring now to FIG. 1, a tractor 10, of a lawn and garden variety, is composed of a main body having a rear operator's station 11 formed above rear wheels 12 and carried on a main frame, part of which is shown at 13. The operator's station includes a seat 14 and a conventional-type steering wheel 15. Positioned within an engine housing is an engine 18 having a front main output shaft 19 on which is connected a pulley structure, indicated in its entirety by the reference numeral 20. The frame 13 is composed of a pair of fore-and-aft extending main angleiron beams, one of which is shown at 22 on the right side of the tractor, that are positioned on opposite sides of the engine 18. Cast into the engine block of the engine 18 are a pair of horizontal ledges 23 on opposite sides of the engine 18. The ledges 23 are mounted or fixed to a pair of vibration-dampening motor mounts 24 between the ledges 23 and the respective horizontal flanges of the angle-iron side members or beams 22. Such can best be seen in FIG. 2. It should here be noted that the respective motor mounts 24 are positioned generally on or close to the center of gravity of the engine 18. The engine mounts may be of any of a variety of such presently on the market and serve to dampen the vibrations of the internal combustion engine with respect to the main frame 13 of the tractor.

The tractor frame 13 also includes a transverse tubular beam 25 positioned just forwardly of the engine and which extends between the main side beams 22. Opposite ends of the beam 25 may be welded or otherwise fixed to the side frames 22. The beam 25 is positioned just under the shaft 19 and has provided in its central upper portion a bearing housing 26 concentric with the shaft 19.

The pulley structure 20 is composed of a pulley 31 that has three belt grooves 32 on one end thereof and a hub portion 33 that projects from the belt portion toward the engine 18. The hub 33 has internal and external cylindrical surfaces 34, 35, respectively, that are concentric with the shaft 19. The hub 33, as is clearly apparent in FIG. 3, extends into the bearing housing 26. A bearing 36 is carried in the housing 26 and journals the outer surface 35 of the hub. The inner surface 34 of the hub is spaced from and completely out of contact with the shaft 19. The grooved end of pulley 31 has an internal wall or surface 37 that forms, with the outer surface of the shaft 19, an annular cavity at that end of the pulley. Retained within the cavity is a shock-absorbing shaft mount, indicated by the reference numeral 40. The insert 40 is composed of inner and outer metal rings 41, 42 that have bonded to their outer and inner surfaces, respectively, an elastomer or rubber annulus layer 43.

Figure 3:
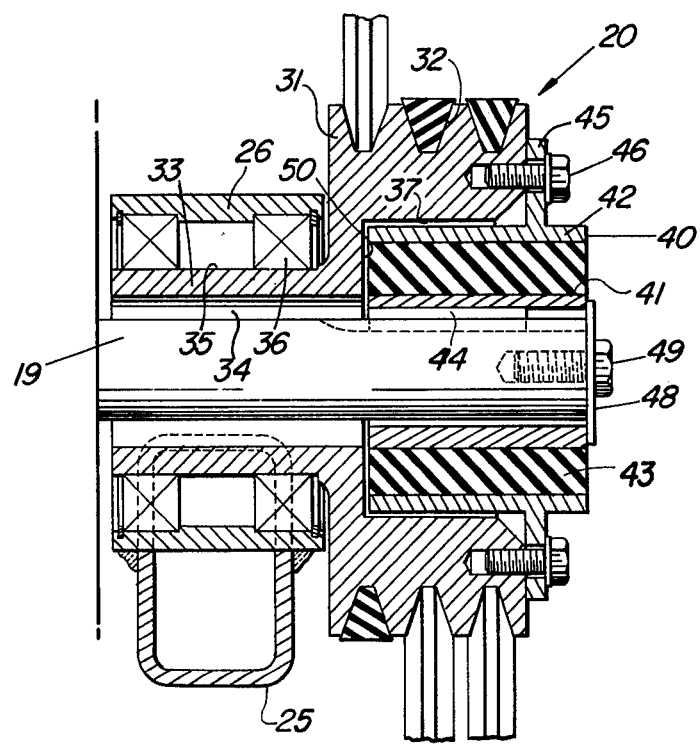
FIG. 3 is a vertical sectional view through the pulley structure of the preferred embodiment of the invention.

The ring 41 is mounted directly on the shaft 19 and is fixed to rotate therewith by a key 44, there being provided suitable keyways in the shaft 19 and ring 41. The outer metal ring 42 is provided with radially extending flanges 45 that bear against the end of the pulley 31. Bolts 46 are provided to connect the flanges 45 directly to the pulley 31. A plate 48 is welded or otherwise fixed to the inner ring 41 and has a bolt 49 extending into the shaft 19 so as to hold the entire insert 40 in a fixed axial position with respect to the shaft. It should here be noted, and as is shown in FIG. 3, that the insert is spaced axially from a radial shoulder 50 that extends between the two inner cylindrical surfaces 34 and 37. Thus, it becomes apparent that the only movement between the pulley member 31 and the shaft 19 must come through the rubber or elastomer layer 43. Vibration, commonly occurring due to the natural vibration of the internal combustion engine 18 and its shaft 19, is dampened by the rubber layer or insert 43. Similarly, surges created in the belt drive will be dampened by the rubber insert 43. Since the bearing 36 is supported directly on the frame 13 through the bearing housing 26, the pulley, itself, serves as a support for the engine 18 at the shaft 19. Since the engine's other mounting blocks 24 are close to the center of gravity of the engine, the vertical loads on the bearing 36 and the bearing housing 26 will be relatively small since the support for the engine at that point will be more of a balancing type of support.

Figure 4:
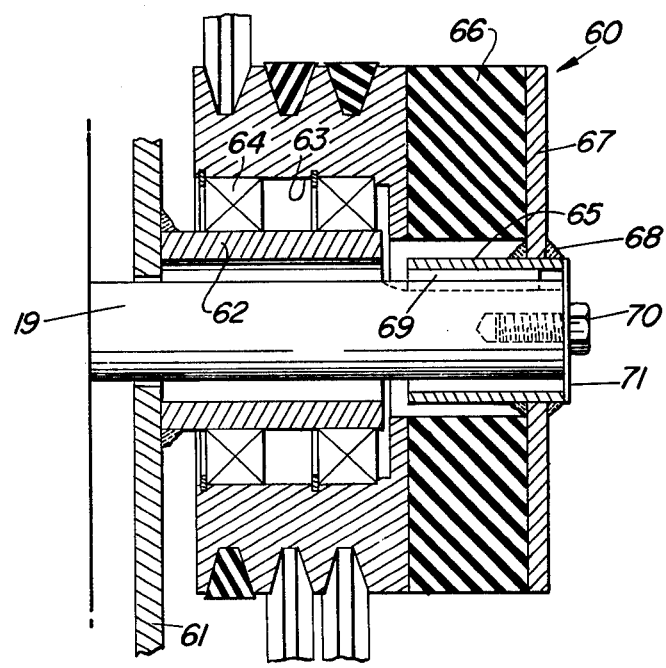
FIG. 4 is a view similar to FIG. 3 and showing a modified form of the invention.

Referring now to FIG. 4, which shows a modified form of the invention, there is provided a pulley structure 60 supported directly on the frame 13 by means of a vertical structural plate 61 that extends between the side beams 22 and carries, at its upper end, a bearing support which is no more than an annular collar concentric with the shaft 19 and which projects into a cavity of the pulley structure 60 formed by an internal cylindrical surface 63 spaced from the outer surface of the cylindrical member 62. A pair of bearing races 64 extend between these surfaces and journal the pulley structure 60 on the main frame 13.

The pulley structure 60 further includes a rubber or elastomer annulus layer 66 that has radial surfaces bonded to the radial outer end of the metal pulley portion and to the inner surface of a plate 67. The plate 67 has its radially inner edges welded, as at 68, to the outer surface of a metal collar 69 which is supported directly on and keyed at 69 to the shaft 19. The entire pulley structure 60 is held on the shaft 19 by a bolt 70 which bears against a plate 71 and is threaded into the outer end of the main drive shaft 19.

The modified form of the invention operates substantially in the manner of the previous form. The entire pulley structure 60 is supported on the main frame of the tractor by the structural plate 61 and the bearing races 64, 65. The shaft 19 is likewise supported on the main frame by the pulley structure 60 and the structural member 61. Should vibrations in the shaft 19 occur due to the vibrations inherent in an internal combustion engine, the elastomer cushion 16 operates to dampen such vibrations and prevents their being passed into the main frame 13 of the tractor. Thus, the entire engine 18 is supported on vibration-dampening devices which include both the motor mounts 24 and the pulley structure 60.

Referring to either forms of the invention, should torsional load or surges of power in either driven portions of the tractor occur, or upon engagement of a driven portion of the tractor, such torsional loads will be dampened by the respective elastomer cushions and will prevent damage to the engine. The belt loads will also create direct downward forces on the pulleys 20, 60, causing, unless otherwise restricted, the engine to dip downwardly, placing excessive load on the rear engine mounts 24. However, with the pulleys 20, 60 being supported totally on the tractor frame, such dipping will not occur.

I claim:

1. A suspension system for mounting an engine on a supporting structure, said engine having a vibrating-inducing power unit with an external power shaft, said system comprising:
   a vibration dampening engine mount structure supporting the engine on the supporting structure near the center of gravity thereof;
   a pulley concentric with and out of contact with the shaft, having a hub end and a grooved end offset axially from one another, said groove end of said pulley having an internal cylindrical wall spaced from the shaft and defining therewith an annular cavity opening axially to the end of the pulley;
   a bearing supported on the supporting structure and externally journalling said pulley hub to thereby effect support of said pulley on the supporting structure;
   a layer of elastomer material in the annular cavity between the shaft and groove end of the pulley and means connecting the layer of elastomer material to the shaft and pulley comprising a pair of concentric inner and outer rings seated in the cavity and having the layer of elastomer material sandwiched therebetween and bonded thereto and with the outer of said rings being fixed to the pulley and the inner of said rings being fixed to the shaft to thereby affect rotation of the pulley in response to rotation of the shaft and for mounting the shaft end of the engine on said supporting structure through the elastomer layer.

2. A suspension system for mounting an engine on a supporting structure, said engine having a vibrating-induced power unit with a rotating external power shaft, said system comprising: a pair of vibration-dampening engine mount devices supporting the engine on the supporting structure near the center of gravity thereof; a pulley concentric with the shaft and having a pulley portion and a cylindrical wall portion extending from said pulley portion toward said engine and having different diameters, said portions being concentric with and spaced radially from and out of contact with the shaft; a bearing supported on the supporting structure to effect support of said pulley on the supporting structure; a connecting structure extending within a recess in said pulley portion from a surface facing away from said engine including an annular layer of elastomer material having inner and outer peripheral surfaces parallel to said shaft secured to respective ring members which are fixed to the pulley and shaft, respectively, to rotate respectively therewith to effect rotation of the pulley in response to rotation of the shaft and for mounting the shaft on said supporting structure through said layer of elastomer material.

3. The invention defined in claim 2 in which the engine mount devices are one of each on opposite sides of the power unit directly across from one another so that the engine is substantially balanced thereon and the pulley serves to retain the power unit in its balanced condition on said mount devices.

4. The invention defined in claim 2 in which the pulley's wall portion and groove portions are offset axially from one another and said cylindrical wall portion is externally journalled in said bearing.

* * * * *